(12) United States Patent
Ghetie

(10) Patent No.: US 12,511,141 B2
(45) Date of Patent: Dec. 30, 2025

(54) SYSTEM AND METHODS FOR INPUT/OUTPUT DEVICE EMULATION

(71) Applicant: SDG Logic Inc., Hillsboro, OR (US)

(72) Inventor: Sergiu Ghetie, Hillsboro, OR (US)

(73) Assignee: SDG Logic Inc., Hillsboro, OR (US)

(*) Notice: Subject to any disclaimer, the term of this patent is extended or adjusted under 35 U.S.C. 154(b) by 889 days.

(21) Appl. No.: 17/825,997

(22) Filed: May 26, 2022

(65) Prior Publication Data

US 2022/0391235 A1    Dec. 8, 2022

Related U.S. Application Data

(60) Provisional application No. 63/197,198, filed on Jun. 4, 2021.

(51) Int. Cl.
*G06F 9/455* (2018.01)
*G06F 13/20* (2006.01)

(52) U.S. Cl.
CPC .......... *G06F 9/45504* (2013.01); *G06F 13/20* (2013.01)

(58) Field of Classification Search
CPC .............................. G06F 9/45504; G06F 13/20
See application file for complete search history.

(56) References Cited

U.S. PATENT DOCUMENTS

| | | |
|---|---|---|
| 2017/0185766 A1* | 6/2017 | Narendra Trivedi ....................... G06F 21/606 |
| 2020/0387326 A1* | 12/2020 | Chan ..................... G06F 3/061 |
| 2021/0103443 A1* | 4/2021 | Potash .................. G06F 9/3824 |

* cited by examiner

*Primary Examiner* — Brian W Wathen
(74) *Attorney, Agent, or Firm* — Polsinelli LLP (57) ABSTRACT

A system is disclosed for Input/Output (I/O) device emulation that allows a service provider to configure and enforce a policy for software access to some or all I/O resources in a platform. I/O device emulation enables service providers to protect their platforms from malicious guest software that may be executed on associated platforms that has direct access to I/O resources in case of bare-metal servers, escalates the privilege level from guest to host in case of hosted-Virtual Machine servers, or escalates the privilege level from guest to System Management Mode in case of either bare-metal servers or hosted-Virtual Machine servers. The technology enables service providers to protect their platforms from malicious guest software running on their platforms that either has direct access to legacy I/O and memory mapped I/O resources. In one illustrative example, the platform may include a microprocessor.

20 Claims, 7 Drawing Sheets

SYSTEM AND METHODS FOR INPUT/OUTPUT DEVICE EMULATION

CROSS-REFERENCE TO RELATED APPLICATIONS

This application is related to and claims priority under 35 U.S.C. § 119(e) to U.S. Patent Application No. 63/197,198, filed Jun. 4, 2021, entitled "System and Methods For Input/Output Device Emulation," the entire contents of which is incorporated herein by reference for all purposes.

TECHNICAL FIELD

The present disclosure generally relates to confidential computing systems with secure operation and communication capabilities to input/output components of a processing unit.

BACKGROUND

Confidential computing can refer to secure (e.g., physically secure) computing where software or firmware executed on computing resources are able to securely communicate with local or remote devices while maintaining the integrity of the data being transmitted. Often, malicious entities may target computing resources, such as to obtain unencrypted data, tamper with encrypted or unencrypted data, send fraudulent messages to the computing resources, or to physically destroy or damage such computing resources. Protecting against malicious entities requires hardware and software engineers to balance security, runtime, and memory constraints, among others. Microprocessors are particularly vulnerable when communicating with components or devices outside of the microprocessor. For example, many computing systems utilize one or more Input/Output (I/O) devices that are in electrical communication with a microprocessor. The I/O devices are generally made available to software executed by the microprocessor. However, malicious software or programs may utilize the access to such I/O devices to obtain otherwise secure data, tamper with encrypted or unencrypted data, and/or cause damage to components of the microprocessor. Careful control over the granting of access to I/O devices of a computing environment is key to secure computing.

BRIEF SUMMARY

Disclosed are systems, apparatuses, methods, and computer-readable media for implementing a secure computing management technique. The secure computing management technique may include such operations as storing, by a processing device and in a protected portion of a memory device, input/output (I/O) device access rights associated with one or more I/O devices in communication with the processing device, accessing, in response to a request to access the one or more I/O devices, at least one I/O device access right from the protected portion of the memory device, and emulating, based on the at least one I/O device access right, a register associated with the one or more I/O devices, the register storing data transmitted from the processing device and the one or more I/O devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The foregoing and other objects, features, and advantages of the present disclosure set forth herein should be apparent from the following description of particular aspects of those inventive concepts, as illustrated in the accompanying drawings. The drawings depict only typical aspects of the present disclosure and, therefore, are not to be considered limiting in scope.

DETAILED DESCRIPTION

Certain aspects and embodiments of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application.

Aspects of the present disclosure involve systems and methods for Input/Output (I/O) device emulation that allows a service provider (e.g., an edge service provider, a cloud service provider, and/or other service provider) to configure and enforce a policy for software access to some or all I/O resources in the platform. I/O device emulation enables service providers to protect their platforms from malicious guest software that may be executed on associated platforms that has direct access to I/O resources in case of bare-metal servers, escalates the privilege level from guest to host in case of hosted-Virtual Machine servers, or escalates the privilege level from guest to System Management Mode (SMM) in case of either bare-metal servers or hosted-Virtual Machine servers. As used herein, a bare-metal server is a computer server that hosts virtual machines for one customer as opposed to servers that host multiple consumers. The technology enables service providers to protect their platforms from malicious guest software running on their platforms that either has direct access to legacy I/O and MMIO resources.

In one illustrative implementation, a computing environment may include a microprocessor in communication with one or more I/O devices that may be accessed during execution of a software program by the microprocessor. For example, the software program, during execution by the microprocessor, may issue a request to access an I/O device. The microprocessor may, in turn, process the request and determine the I/O device being requested and determine an access right given to the requesting program. The determined access right may be based on an access policy managed by the microprocessor. Access to the I/O devices in communication with the microprocessor may be provided through legacy I/O ports, Memory-Mapped Input/Output (MMIO) registers, and/or Peripheral Component Interconnect express (PCIe) configuration registers accessible through the legacy ports and through MMIO, among others. Each legacy I/O port, MMIO register, and PCIe configuration register can be assigned a respective policy (e.g., a policy for the legacy I/O port, a policy for the MMIO register, and a policy for the PCIe configuration register) that describes how the microprocessor handles software access to these legacy I/O ports or MMIO registers, such as allow access, block access, or emulate access. Such policies may include separate access right policies for I/O device or a global access right policy for each I/O device. Enforcement of the policies may include storing I/O device access rights in a protected portion of a memory and accessing such access rights in a secure manner that prevents executed software from direct access to the I/O device registers or to alter the established policies. Thus, access rights for the legacy I/O ports, access rights for the MMIO registers, and/or access rights for the PCIe configuration registers may be established through the I/O device access policies. The systems and methods described herein provide for management of such access rights and policies in a safe and secure manner. These and other advantages over the present state of the art through the I/O device emulation technology will be apparent from the present disclosure.

Figure 1:
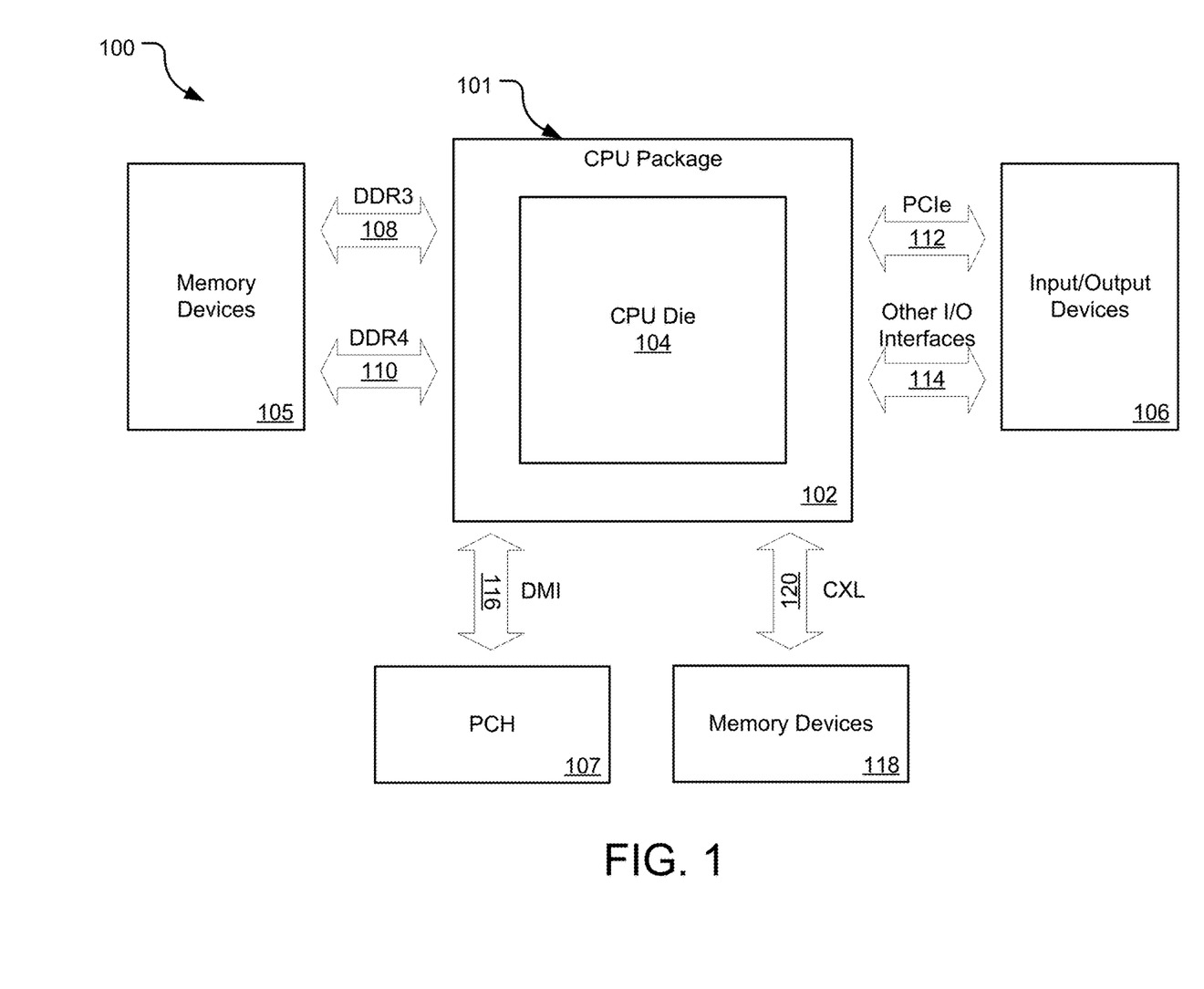
FIG. 1 is a schematic diagram illustrating an example of a computing environment for secure input/output (I/O) device access, in accordance with aspects of the disclosure.

Various aspects of the application will be described with respect to the figures. FIG. 1 is a schematic diagram illustrating an example of a computing environment 100 for secure input/output (I/O) device access in accordance with one illustrative example. The environment 100 may include a central processing unit (CPU) 101 or microprocessor that includes a CPU package 102 on which a CPU die 104 may be mounted or included. In general, the terms CPU, microprocessor, processing device, and the like are used interchangeably throughout this document. Further, although described herein as a CPU 101, it should be appreciated that any type of processing device may be included in the environment 100 to which the methods described herein may be applied. In general, any computing device on which a software or firmware program may be executed may be included in the environment 100. Those of ordinary skill in the art may be aware of the many different types of devices and components included in the CPU 101, which may include but are not limited to, system agents, cores, graphic controllers, control units, arithmetic logic units, registers, caches, memory controllers, buses, clocks, and the like. The CPU 101 may include more or fewer than the components noted herein, which are not illustrated in FIG. 1 for ease of understanding of the environment 100.

The computing environment 100 may also include one or more memory devices 118 in communication with the CPU 101 through one or more interfaces. In one illustrative example, memory devices 105 may include or be one or more Dynamic Random-Access Memory (DRAM) devices, devices and may communicate with the CPU 101 through Double Data Rate (DDR) interfaces 108, 110. Other memory devices, such as memory devices 118, may include one or more Static Random-Access Memory (SRAM) devices, one or more other volatile and/or non-volatile memory devices, any combination thereof, and/or any other memory device (s). The CPU 101, and, more particularly software executed by the CPU, may utilize the memory devices 105, 118 to store data for use by the executing programs. In one particular example, a Basic Input/Output System (BIOS) program executed by the CPU 101 may store data associated with the I/O devices 106, including one or more access rights for accessing the I/O devices. One or more programs or functions may be executed to aid the CPU 101 in managing the storage and retrieval of data, including but not limited to a Memory Encryption Engine (MEE) program. The CPU 101 may also include one or more memory components not illustrated in FIG. 1.

In addition to the CPU 101, the computing environment 100 may include one or more Input/Output (I/O) devices 106 in electrical communication with the CPU. Although illustrated as separate from the CPU 101, the I/O devices 106 may, in some instances, be included within the CPU package 102, such as for a system-on-a-chip (SOC) computing device. In addition, the memory devices 105, 118 and a platform controller hub (PCH) 107 may also be considered as I/O devices as the termed is used herein. An I/O device may include any device that communicates with the CPU 101 via a bus or other communication path or mechanism, including but not limited to, legacy I/O ports, MMIO registers, and PCIe configuration registers. In general, any I/O device 106 may be included in the computing environment 100 and may exchange data with the CPU 101, including but not limited to DRAM devices, non-volatile memory devices, PCH 107, accelerators (such as a graphics processing unit (GPU), Artificial Intelligence devices, field-programmable gate array (FPGA), network adapters, DRAM or persistent memory thermal sensors, etc. Further, each of the I/O devices 106 may communicate with the CPU 101 via one or more I/O industry-standard interface buses. For example, the I/O devices 106 may communicate with the CPU 101 via one or more one or more Peripheral Component Interface Express (PCIe) interfaces 112, the DDR interfaces 108, 110, a Direct Media Interface (DMI) 116, and/or a Compute Express Link (CXL) 120. As illustrated, the PCH 107 may communicate with the CPU 101 through a DMI interface 116, memory devices 105 may communicate with the CPU through DDR interfaces 108, 110, memory devices 118 may communicate with CPU through CXL interface 120, and other I/O devices 106 may communicate with CPU 101 through PCIe interface 112. Many other types of I/O interfaces may also be used, such as Serial Advanced Technology Attachment (SATA), Integrated Drive Electronics (IDE), Universal Serial Bus (USB), System Management Bus (SMBus), Serial Peripheral Interface (SPI), Enhanced Serial Peripheral Interface (eSPI), Local Control Processor (LCP), and the like. Any known or hereafter developed I/O interface standard may be incorporated into the computing environment 100 to provide for the CPU 101 to communication with one or more I/O devices 106 through the methods described herein.

As mentioned, access to the I/O devices 106 may be provided to an executing program or other software through legacy I/O ports, MMIO registers, PCIe configuration registers, and the like. I/O ports refers to specific addresses on an I/O bus of the CPU 101 that may be used to access an I/O device 106 in communication with the CPU. However, as CPU 101 design and complexity have grown, such addresses may no longer provide sufficient range to provide access to possible I/O devices 106 included in the computing environment 100. As such, references to legacy I/O ports herein may refer to specific addresses used by the CPU 101 that may be imported from earlier designs of the CPU. MMIO registers, on the other hand, may use the same address space within a memory to address both memory and a corresponding I/O device 106. The memory and registers of the corresponding I/O device 106 are mapped to (or otherwise associated with) address values such that addresses accessed by the CPU 101 during software execution may refer to a portion of memory 118 or used for accessing a corresponding I/O device 106. Each I/O device 106 may monitor the CPU's address bus and respond to any CPU access of an address assigned to that device, connecting the data bus to the desired device's hardware register. PCIe configuration registers operate in a similar manner in that PCI devices may have a set of registers that are mapped to memory locations, with those registers being accessed by PCIe-connected I/O devices 106.

The CPU 101 may, in many instances, provide access to the I/O devices 106 for software or firmware executed on or by the CPU 101. For example, a software program executed on the CPU 101 may request access to a memory I/O device 106 to load or store data. The CPU 101 may include an I/O device manager or other similar component configured to manage requests and access to I/O devices 106 in communication with the CPU 101. In one instance, such management may include access rights associated with the I/O devices 106. Generally speaking, an access right associated with an I/O device indicates a level of access that the CPU 101 may grant to a requesting application or program, such as allow access or block access, among others. The access rights can be stored in memory and managed by the I/O device manager. In some particular implementations, access to the I/O devices 106 occurs via one or more registers associated with the I/O devices. In still another example, access rights may be associated with a global I/O device driver for the CPU 101. A global I/O device driver may be a program utilized by an operating system executed by the CPU 101 to communicate and control the I/O device 106 in communication with the CPU. In some instances, the operating system may attempt the access the global I/O device driver in response to a request received from a program executed on the CPU 101. Additional operations of I/O device access are described in more detail below.

As noted above, systems and methods are described herein that provide for I/O device emulation. For instance, the I/O device emulation allows a service provider (e.g., an edge or cloud service provider or other service provider) to configure and enforce a policy for software access to some or all I/O resources in the platform. One such platform is illustrated above with relation to the computing environment 100 of FIG. 1. I/O device emulation enables service providers to protect their computing environments 100 or devices from malicious guest software that may be executed on associated environments 100 that request direct access to I/O resources 106 in case of bare-metal servers, escalates the privilege level from guest to host in case of hosted-Virtual Machine servers, or escalates the privilege level from guest to SMM in case of either bare-metal servers or hosted-Virtual Machine servers. In one illustrative example, malicious guest software accessing I/O resources (e.g., the I/O devices 106 of FIG. 1) may install undetectable rootkits in the CPU 101, execute permanent denial of service (PDOS) attacks on the CPU 101, and/or physically damage components of the computing environment 100. In some cases, I/O device emulation enables service providers (e.g., edge or cloud service providers or other service providers) to emulate any I/O device 106 of the computing environment 100. Emulation of the I/O devices can provide tremendous flexibility in managing real hardware I/O devices 106 (partitioning, security, etc.) and/or emulating I/O devices that do not physically exist within the computing environment 100 (mapping virtual I/O devices to local/remote real I/O devices, partitioning, security, etc.).

In one illustrative example, I/O device emulation may be applied to the computing environment 100. In some computing environments 100, the I/O devices 106 of the computing environment may be made available to software or programs executed by the microprocessor 101 through legacy Input/Output ports, Memory-Mapped Input/Output (MMIO) registers, and PCIe configuration registers accessible through the legacy ports and through MMIO. To determine and control a level of I/O device access given by the microprocessor 101 to an executing program, each legacy I/O port, MMIO register, and PCIe configuration register can be assigned a policy that describes how the microprocessor handles software access to these legacy I/O ports or MMIO registers. In some examples, the access policy may include an allow access, block access, or emulate access. An allow access right may instruct the microprocessor to allow the program access to the particular I/O device. A block access right may instruct the microprocessor to block the program from accessing the particular I/O device. An emulate access right may instruct the microprocessor to emulate an access register associated with the particular I/O device to virtualize the I/O device for the executing software. In this manner, direct access to the I/O device register is not provided, but the executed program may interact with the virtualized I/O device and associated registers. Operations for emulating and maintaining an emulated I/O device register is discussed in more detail below.

In some instances, I/O device emulation may include a microprocessor 101 secure mode that handles legacy I/O port and MMIO register emulation that is isolated (e.g., completely isolated) from all the other software running on the microprocessor. By isolating the legacy I/O port and MMIO register emulations from other software, the secure mode of the microprocessor 101 may ensure that the other programs are not given access to the I/O device through malicious program code or patch as a backdoor to accessing and control of the I/O devices. The systems and methods discussed herein may also dramatically reduce a Trusted Compute Base (TCB) handling of legacy I/O and MMIO resources by handling software requests for these resources entirely in the microprocessor 101 firmware (e.g., microcode). Handling the emulation of complex legacy I/O ports and MMIO registers through a minimal microprocessor 101 secure mode provides an performance advantage over a typically large TCB associated with classic operating systems or hypervisors that may contain millions of lines of code. These and other advantages over the present state of the art through the I/O device emulation technology will be apparent from the present disclosure.

In some examples, I/O device emulation may be implemented using a microcode patch to the BIOS program executed on a microprocessor (e.g., the CPU 101 or other microprocessor device). The microcode patch may be an update or other program code that is uploaded to a memory 118 of the computing environment 100 for execution with the BIOS or other firmware executed by the microprocessor 101 during a boot of the microprocessor. The microcode patch may be loaded onto one or all cores of the microprocessor 101 for use in I/O device 106 emulation. Once the microcode patch is loaded, the microprocessor may initialize and train the memory 118 of the computing environment 100 for encryption with integrity and anti-replay. An illustrative example of initializing and training one or more memory components of the computing environment 100 is described below with respect to FIG. 2. As described above, the memory 118 may include or be one or more Dynamic Random-Access Memory (DRAM) devices, one or more Static Random-Access Memory (SRAM) devices, one or more other volatile and/or non-volatile memory devices, any combination thereof, and/or any other memory device(s).

Figure 2:
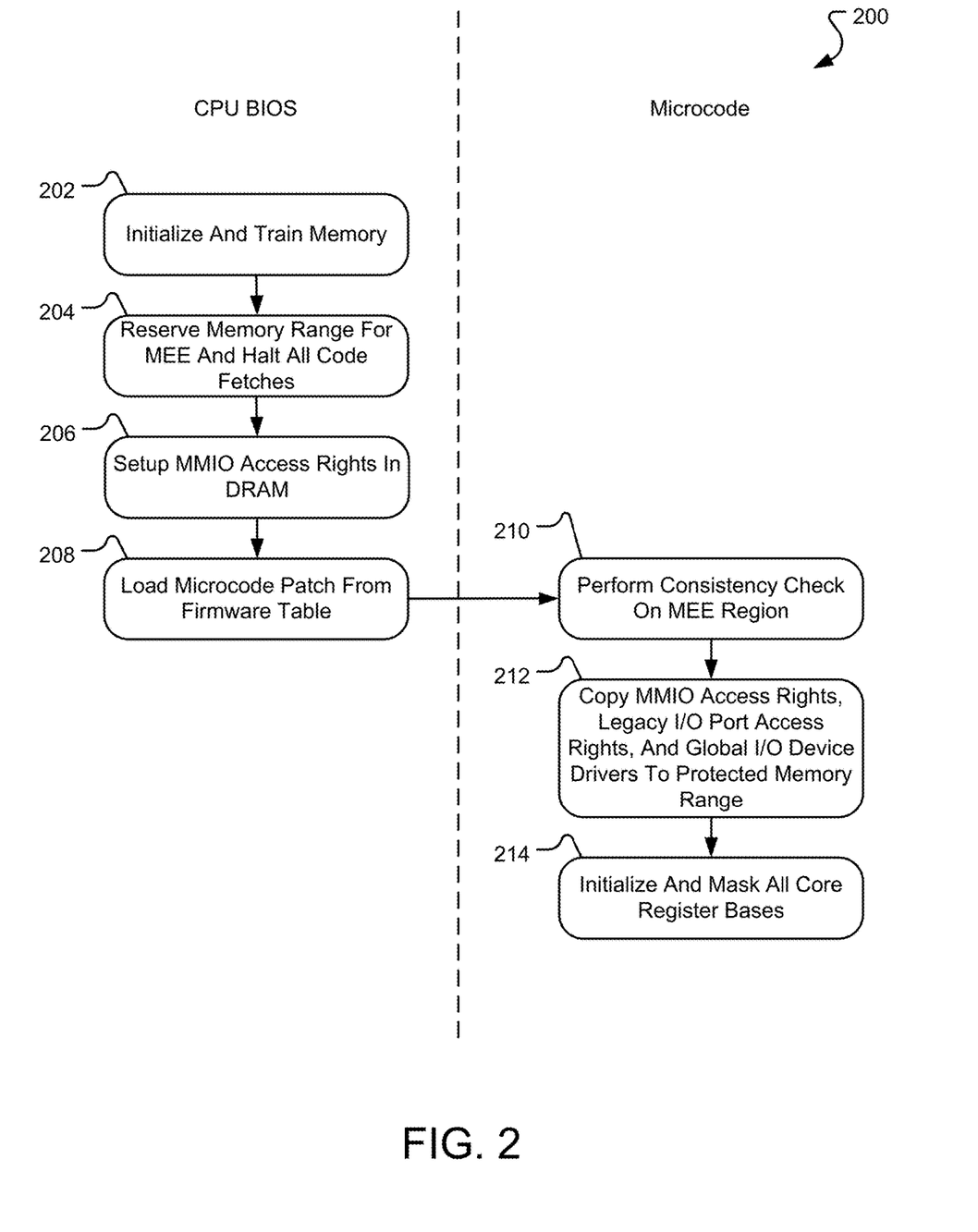
FIG. 2 is a flowchart illustrating an example of a method for initializing memory of a computing environment for secure I/O device access, in accordance with aspects of the disclosure.

FIG. 2 is a flowchart of a general method 200 for initializing memory of a computing environment 100 for secure I/O device access and emulation in accordance with one illustrative example. In general, the operations of the method 200 may be performed by one or more components of the computing environment 100 and, in one particular implementation, the CPU 101 executing a software or firmware program. Further, the operations of the method 200 may be performed by the CPU 101 executing a BIOS program and/or a microcode program.

Beginning in operation 202, the BIOS program may be executed to initialize and train one or more memory components of the computing environment 100. In some examples, training of the memory components may include generating one or more protocols for secure storage of data in the memory components. For example, the training may include providing memory integrity and anti-replay techniques to the storage of data in the memory components, although other types of memory training and initialization are similarly contemplated. Initialization and training of the memory reduces or eliminates the chance of memory overlaps, for example to avoid a situation in which the same data is written to two different locations, or data is written to the wrong location, overwriting the data that was already at that location. Memory integrity techniques ensure that data cannot be modified by a malicious code or program and anti-replay prevent a malicious program from replaying memory storage commands to determine the data being stored in memory or accessed. Initialization and training of the memory components may also include the BIOS executing a Memory Encryption Engine (MEE) program or code to set-up the memory addresses for use by the microprocessor 101.

In operation 204, the BIOS may reserve a portion of available memory for storage of data pertaining to the I/O device emulation. For example, the BIOS in one particular implementation may reserve the memory in the 1.5 GB (e.g., address 60000000h) to 1.5 GB+256 MB-1 (e.g., address 6FFFFFFFh) range for MEE may setup a memory mapped PCIe configuration space in memory in the 2 GB (e.g., address 80000000h) to 2 GB+256 MB-1 (e.g., address 8FFFFFFFh) range. However, any range of the available memory may be reserved for any number of policies, components, and/or routines of the computing environment 100.

In operation 206, the BIOS may setup MMIO access rights in one or more memory components, such as a DRAM component of the computing environment 100. The MMIO access rights may be setup by the BIOS in accordance with an access policy for the I/O devices of the computing environment 100. In some instances, the access policy may be established by service providers (e.g., an edge service provider, a cloud service provider, and/or other service provider) to which the computing environment 100 is connected. For example, the computing environment 100 may be a portion of an application server of a cloud computing environment managed by a cloud service provider. The cloud service provider may generate and provide an I/O device access policy for execution by one or more processing devices of the application server. In another example, a manufacturer of the CPU 101 or a programmer of the BIOS program may determine the I/O device access policy that is setup by the BIOS. In general, any entity, device, and/or program may instruct the BIOS to setup the MMIO access rights in accordance with an access policy, which may be stored in the memory components by the BIOS. In one implementation, the BIOS may setup the MMIO access rights in the memory components at a particular address, such as at address 40000000h. In some examples, the BIOS may setup other I/O device access rights in the memory components, such as the legacy I/O port access rights and/or the global I/O device driver. In one implementation, the legacy I/O port access rights may be setup at address 41000000h and the global I/O device driver may be setup at address 42000000h. In such examples, the MMIO access rights, legacy I/O port access rights, and the global I/O device driver comprise the I/O access rights for the computing environment 100.

The BIOS may load the microcode patch for I/O device emulation in operation 208. In one implementation, the BIOS may obtain the microcode patch from a firmware interface table for loading onto the CPU 101 for execution. The firmware interface table may be, in some examples, a data structure utilized by the BIOS to obtain starting memory locations for components of the firmware. Thus, the BIOS may determine the location of the microcode patch stored in memory from the firmware interface table. In operation 210, the microcode may launch a Memory Check (MCHECK) module or program that performs consistency checks on the MEE region and, if the consistency checks pass (no overlapping with other sensitive regions), the microcode may initialize the memory hardware. In one example, initialization of the memory hardware may include generating one or more encryption keys for the encryption/decryption and integrity of the memory 118. In operation 212, the microcode may copy the access rights setup by the BIOS into a protected range of the available memory. In one particular implementation and extending the example discussed above, the microcode may copy the MMIO access rights from address 40000000h to address 60000000h, copy the legacy I/O port access rights from address 41000000h to address 61000000h, and copy the global I/O device driver from address 42000000h to address 62000000h. However, the protected portion of the memory into which the access rights are copied may be any range of memory addresses and the particular examples discussed herein are used for clarification and should not be considered limiting to the described technique.

In operation 214, the microcode may initialize and mask core register bases. For example, the microcode may initialize the core register base and mask the register base with another memory region. Some processing devices utilize a base and a mask for range registers. In one example, a given physical address A may be checked by the CPU to see if it overlaps with an address range, such as AMRR0 range. The CPU 101 may then perform the logical equation A AND AMRR0 Mask=AMRR0 Base AND AMRR0 Mask. If both terms are equal, then A overlaps with the AMRR0 range. Other processing devices may utilize a base and a limit, rather than a base and a mask. For such devices, the microcode may initialize the mask core register base and the register limit in operation 214.

In one particular example, the microcode may initialize the register base with address 60000006h and mask with address 7F:F0000C00h (to cover the entire MEE region). In addition, the microcode may initialize and mask the core Address Match Range Register 0 (AMRR0) base, the core Processor Reserved Memory Range Register (PRMRR) base, and the Uncore Processor Reserved Memory Range Register (PRMRR) base. Continuing the example above, the microcode may initialize the register base with address 60000006h and mask with address 7F:F0000C00h to cover the entire MEE region, initialize the AMRR0 base with address 6C000000h and mask with address 7F:FC000800h to cover the top 64 MB of the MEE region containing the metadata, initialize the PRMRR base with address 80000006h and mask with address 7F:80000E00h to cover the 2 GB to 4 GB-1 lower MMIO range, and initialize the Uncore PRMRR base with address 60000000h and mask with address 7F:F0000C00h. In one implementation, the MEE region of the memory may no longer be accessible to software running on the platform until the next cold or warm reset. In this manner, the region of memory is used to protect the MMIO access rights, the legacy I/O port access rights, and the global I/O device driver.

Figure 3:
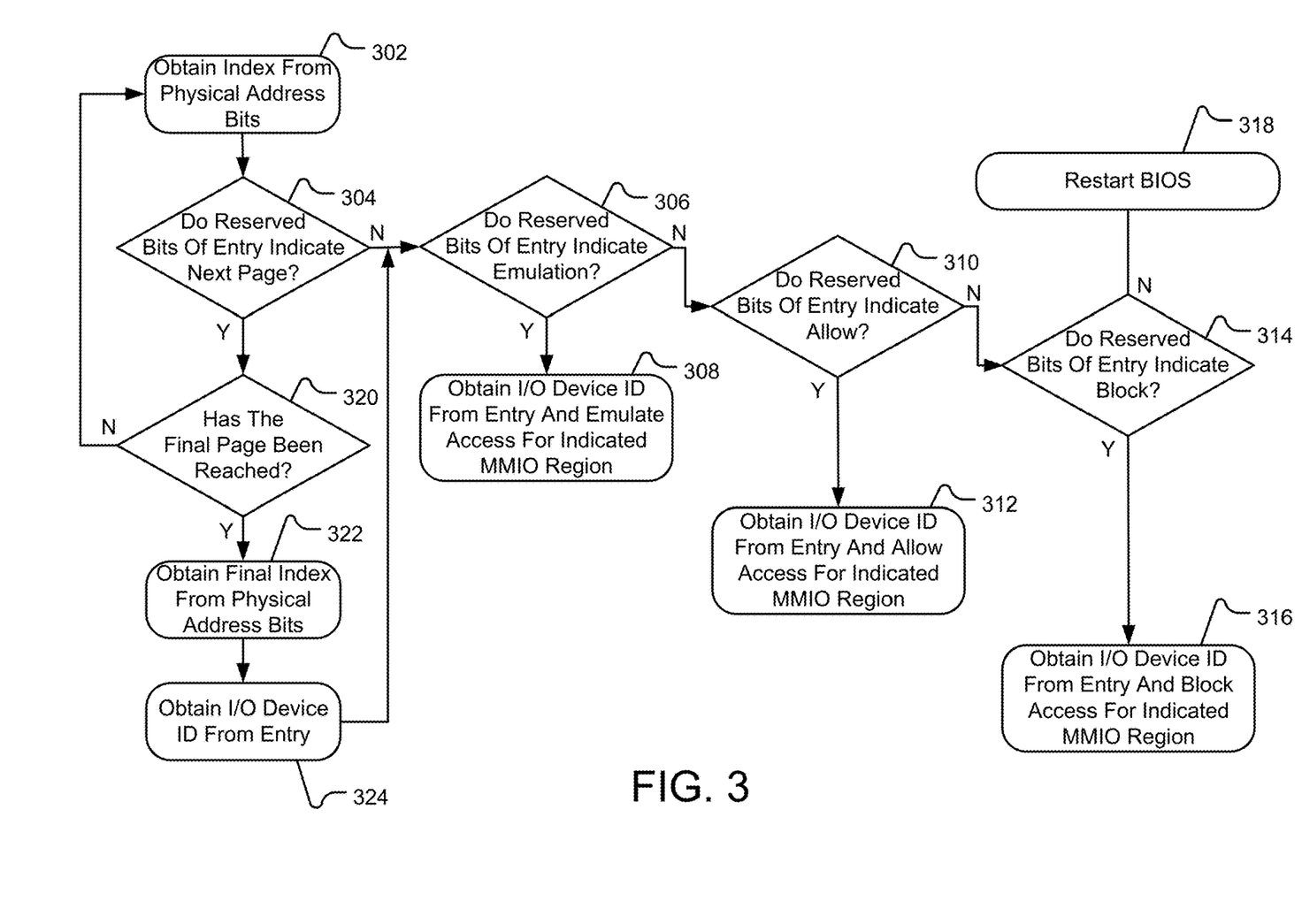
FIG. 3 is a flowchart illustrating an example of a method for managing I/O access rights in memory of a computing environment, in accordance with aspects of the disclosure.

Through the method 200 of FIG. 2, the memory of the computing environment 100 may be initialized for secure I/O device access. As described, the I/O access rights are located within a protected region within the memory (e.g., the MEE region) that is not accessible by software running on the platform. Such access rights may include the MMIO access rights, the legacy I/O port access rights, and the global I/O device driver for the computing environment 100. The microprocessor 101 may utilize the secure I/O access rights to manage I/O access by software executed on the computing environment 100. For example, the microprocessor 101 may determine MMIO access rights when a request for access to an MMIO register is received from an executed program. FIG. 3 is a flowchart of a method 300 for managing I/O access rights in memory of a computing environment in accordance with one aspect. The operations of the method 300 may be performed by a microprocessor, such as CPU 101 of computing environment 100, or any other computing device. In general, the flowchart of FIG. 3 describes a method 300 for the microprocessor to determine a stored I/O memory mapped I/O access right associated with the computing environment 100. The MMIO access right may be established by a service provider or other managing entity to enforce one or more I/O access policies, among other reasons.

In one illustrative example, the MMIO access rights may be stored in any number of pages within the memory. Each page may include multiple entries corresponding to MMIO access rights for the computing environment 100. Obtaining a particular MMIO access right from the pages may include utilizing a portion of a physical address to determine an entry from one of the memory pages that corresponds to an access right for an I/O device. For example, the microprocessor may determine the access rights of a given MMIO register by performing a walk of the MMIO access rights pages through the method 300 described below. The entries of the access rights pages may be accessible based on bits included in a physical address received by the microprocessor. In one particular example, the microprocessor may support 39-bit physical addresses (512 GB), with physical address bits [38:30] as the index (0-511) into the very first MMIO access rights page, physical address bits [29:21] as the index (0-511) into the second MMIO access rights page, physical address bits [20:12] as the index (0-511) into the third MMIO access rights page, and physical address bits [11:3] as the index (0-511) into the fourth and final MMIO access rights page. The specific bit ranges and index identifiers discussed herein are simply examples, however, with other configurations of bits and index identifiers also contemplated. Through these index values, the microprocessor may walk through the MMIO access rights pages and entries to obtain a particular access right for I/O access as requested by a program.

Beginning in operation 302, the microprocessor obtains an index identifier from the bits of the physical address. As discussed above, physical address bits [38:30] may be used as the index (0-511) into the first MMIO access rights page. In one illustrative example, each page may include 512 2-byte entries per page such that each page is 1024 bytes. Each index in the MMIO access rights page may be bits [9:1] of its address, with bit 0 as 0, although other configurations are also contemplated. Thus, in operation 302, the microprocessor may access physical address bits [38:30] to determine which entry in the first MMIO page is to be accessed. In the above example, the first access rights page is located in memory at address 60000000h, with the index in the MMIO access rights page may be bits [9:1] of its address.

The layout of the 2-byte entry may include a 2-bit indicator portion that signals the microprocessor to take an additional action. For example, if bits [1:0] of the 2-byte entry associated with the obtained index value is a value [00], the microprocessor is instructed to walk to the next MMIO access rights page. Other values in bits [1:0] of the 2-byte entry instruct the microprocessor to perform other actions, as described in more detail below. Therefore, in operation 304, the microprocessor may determine if the indicator bits of the entry indicate or instruct the microprocessor to walk to the next access rights page. Instances in which the indicator bits instruct the microprocessor to walk to the next access rights page, the remaining bits of the 2-byte entry provide the address bits of the next access rights page. For example, bits [15:2] of the 2-byte entry may contain the next MMIO access rights page address bits [23:10]. Walking the access rights page is described in more detail below.

Assuming the indicator bits of the entry is anything other than [0:0], the microprocessor may determine if the indicator bits of the entry indicate an emulation access right in operation 306. In one example, the microprocessor should stop walking the pages and assign an emulate access right for indicator bits of [0:1], although other values are contemplated. Thus, if the microprocessor determines in operation 306 that the indicator bits have a value of [0:1], the microprocessor may stop walking the MMIO access rights pages and assign the emulate access rights to the MMIO region associated with the current MMIO access rights page in operation 308. In one example, the current MMIO access rights page may be 1 gigabyte (GB) in size. If the indicator bits are other than [0:1], the microprocessor may determine, in operation 310, if the indicator bits have a value of [1:0], which may indicate an allow access right. If the microprocessor determines that the indicator bits have a value of [1:0], the microprocessor may stop walking the MMIO access rights pages and assign the allow access rights to the 1 GB MMIO region associated with the current MMIO access rights page in operation 312. Similarly, the microprocessor may determine, in operation 314, if the indicator bits have a value of [1:1], which may indicate a block access right. If the microprocessor determines that the indicator bits have a value of [1:1], the microprocessor may stop walking the MMIO access rights pages and assign the block access rights to the MMIO region associated with the current MMIO access rights page in operation 316. The microprocessor may restart the BIOS in operation 318 for any failure to determine the indicator bits of the 2-byte entry.

Returning to operation 304, the microprocessor may determine that the indicator bits instruct walking to the next MMIO access rights page. In operation 320, the microprocessor may determine if the last access rights page has been reached. If not, microprocessor will walk to the next MMIO access rights page with the address bits [23:10] equal to bits [15:2] of the corresponding entry in the first MMIO access rights page. Further, the microprocessor may use physical address bits [29:21] as the index (0-511) into the second MMIO access rights page (the index in the MMIO access rights page are bits [9:1] of its address, bit 0 is 0) and proceed to operation 304 to determine if the indicator bits of the indexed entry instructs walking to the next MMIO access rights page. In one example, a bit value of [0:0] may indicate walking to the next page, as described above. For any other value in the indicator bits, the microprocessor may execute operations 306-318 as described above, except for a MMIO region associated with the current MMIO access rights page. In one example, the current MMIO access rights page may be 2 MB in size.

The above operations may continue to cause the microprocessor to walk to a third MMIO access rights page. The microprocessor uses physical address bits [20:12] as the index (0-511) into the third MMIO access rights page (the index in the MMIO access rights page are bits [9:1] of its address, bit 0 is 0). In one example, a bit value of [0:0] may indicate walking to the next page, as described above. For any other value in the indicator bits, the microprocessor may execute operations 306-318 as described above, except for a MMIO region associated with the current MMIO access rights page (the third page). If bits [1:0] of the first MMIO access rights page are both zero, the microprocessor will walk the next MMIO access rights page with the address bits [23:10] equal to bits [15:2] of the corresponding entry in the second MMIO access rights page.

In operation 320, the microprocessor may determine if the final page of MMIO access rights has been reached. In this provided example, the final page is the fourth page. However, any number of pages may be used and walked by the microprocessor to manage the MMIO access rights for the computing environment 100. If the final page has been reached, the microprocessor obtains the final index value from the physical address bits in operation 322. In one particular example, the microprocessor uses physical address bits [11:3] as the index (0-511) into the fourth and final MMIO access rights page (the index in the MMIO access rights page are bits [9:1] of its address, bit 0 is 0). In operation 324, the microprocessor may obtain an I/O device ID from the indexed entry. In one illustrative example, the layout of the 2-byte entry in the fourth page may include bits [15:4] to contain the I/O device ID (a value between 0-4095). Following obtaining the I/O device ID, the microprocessor may continue to operations 306-318 as described above. However, for entries in the fourth page, bits [3:2] of the 2-byte entry may contain the access rights for an upper 32-bit MMIO register (with 00b/0 1b=emulate access rights, 10$b$=allow access rights and 1 1b=block access rights) and bits [1:0] contain the access rights for a lower 32-bit MMIO register (with 00b/0 1b=emulate access rights, 10$b$=allow access rights and 1 1b=block access rights).

Figure 4:
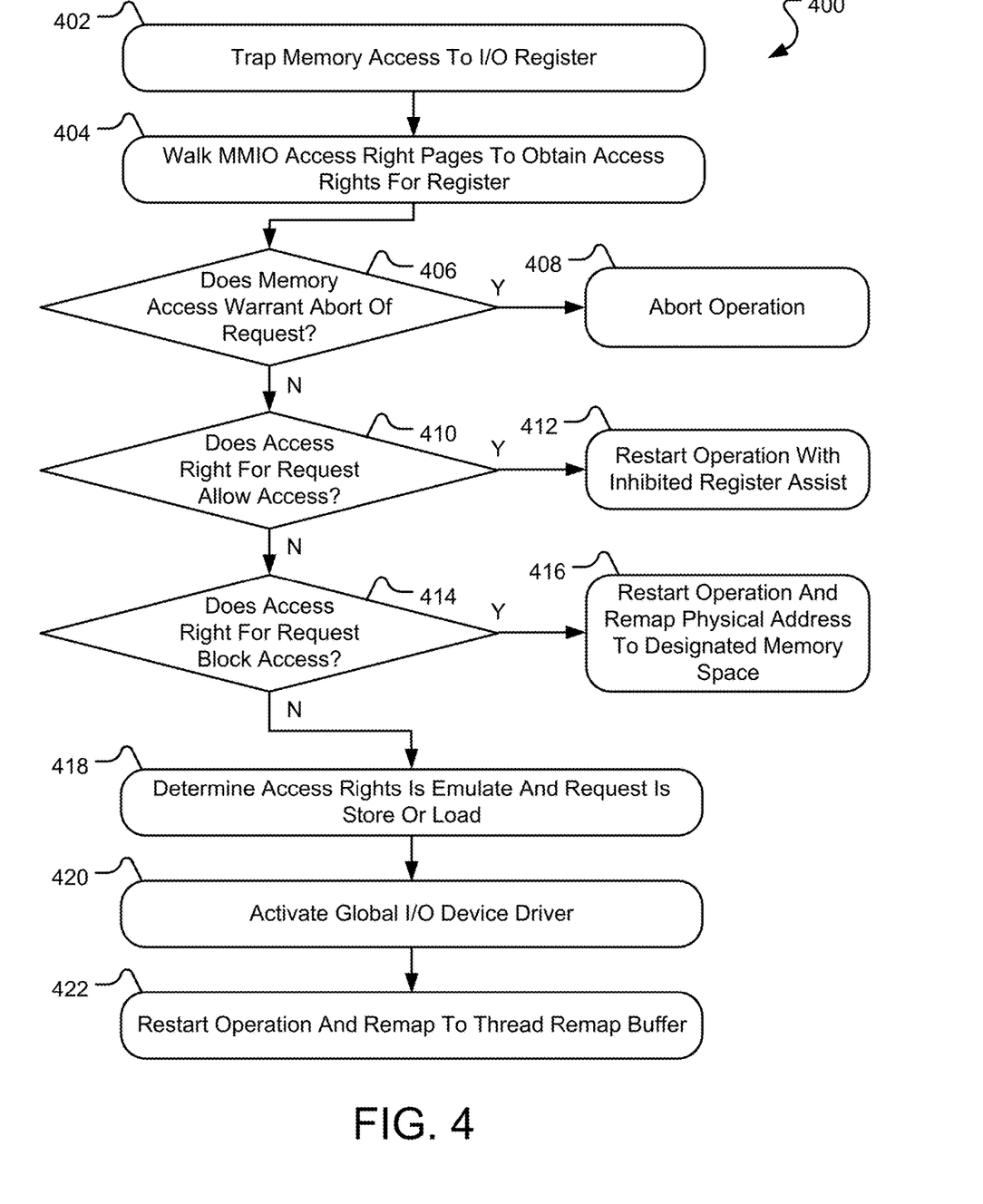
FIG. 4 is a flowchart illustrating an example of a method for managing memory mapped I/O (MMIO) access rights in response to an access request, in accordance with aspects of the disclosure.

With the I/O access rights stored in the memory of the computing environment 100, the microprocessor may begin handling I/O access requests based on the stored access rights. For example, FIG. 4 is a flowchart of a method 400 for managing memory mapped I/O (MMIO) access rights in response to an access request in accordance with one aspect. Similar to above, the operations of the method 400 may be executed by the microprocessor or any other computing device. Beginning in operation 402, the microprocessor may trap all memory access requests for a particular range of the memory. In one illustrative example, the BIOS of the microprocessor may include a Range Register (RR) assist mechanism for trapping the memory access access requests. Trapping of memory access requests may include intercepting the requests before being executed such that the requests can be completed in a secure mode. Once trapped, the microprocessor, in operation 404, may begin walking the MMIO access right pages through the method 300 described above to determine the access rights for the upper and lower 32-bit MMIO register or registers the software is attempting to access. In one illustrative example, split accesses across lower and higher 32-bit MMIO registers part of the same 64-bit MMIO register are permitted as long as the access rights for both 32-bit MMIO register components are identical.

In operation 406, the microprocessor may determine if the memory request warrants an abort of the process. For example, the microprocessor may consider particular MMIO access requests to be unsafe and lead to aborting the request. Some examples of such requests may include MMIO accesses larger than 8 bytes, access requests crossing a 64-bit boundary, physical accesses, accesses while utilizing cache memory is active, code fetches, and particular page walks may result in the microprocessor entering an unbreakable shutdown state in operation 408. Other examples of a memory access that warrants abort of the memory request is the obtained access rights causes a lower and upper 32-bit MMIO registers in case of a split MMIO access within the same 64-bit MMIO register or the data memory access is part of a complex instruction that attempts to access multiple MMIO registers (with different addresses).

Assuming that the memory request is valid, the microprocessor may, in operation 410, determine if the access right associated with the request and obtained in operation 404 is an "allow" access right. If yes, the microprocessor may restart the assisting micro-operation in operation 412 while inhibiting RR assists for memory access requests. If the microprocessor determines that the access right is not an allow right, the microprocessor may determine, in operation 414, if the access right associated with the request is a "block" access right. If yes, the microprocessor may restart the assisting micro-operation in operation 416 while remapping the physical address to a designated memory space to block the access. In one illustrative example, the designated memory space may be an Uncore Abort Page memory space that, when accessed, forces an uncacheable memory type.

If the obtained access rights for the memory request is not an allow or block right, the microprocessor may determine that the access right is an emulate access right in operation 418. Further, the microprocessor may determine whether the memory request is one of a load-type request or a store-type request. In some instances, the memory request may be one of a load, load with store intent, or load with store intent lock data. Store memory requests may include store or store unlock data memory access. For load requests with access rights of emulate, the microprocessor activates the global I/O device driver in operation 420. The global I/O driver performs the emulation of the load access using the information provided by the microprocessor (physical address, access type, access size, microprocessor thread identifier). Further, the global I/O driver may then exit, and the microprocessor may restart the assisting micro-operation while remapping it to the per-microprocessor thread remap buffer in operation 422.

If the access right for a store or store unlock data memory access is emulate, the microprocessor may first restart the assisting micro-operation while remapping it to the per-microprocessor thread remap buffer. The microprocessor may then pend a high-priority trap event that will be taken by the microprocessor at the very end of the instruction. The microprocessor may also exit to the global I/O device driver in operation 420. The global I/O driver may perform the emulation of the store access using the information provided by the microprocessor (physical address, access type, access size, microprocessor thread identifier and data located in the per-microprocessor thread remap buffer). Following the emulation, the global I/O driver may exit, and the microprocessor restarts the next instruction in the instruction stream in operation 422.

Figure 5:
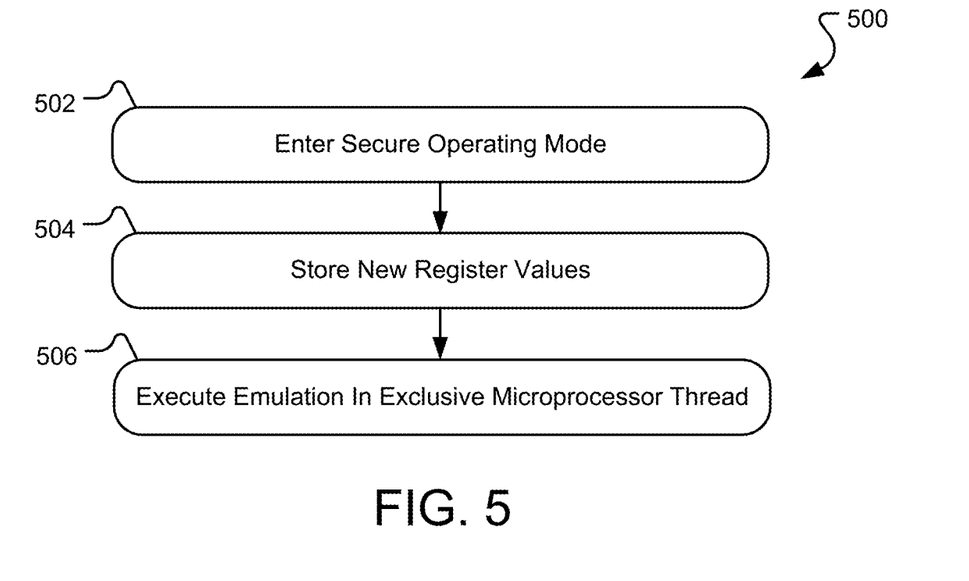
FIG. 5 is a flowchart illustrating an example of a method for utilizing a global I/O device driver to manage I/O access rights in a computing environment, in accordance with aspects of the disclosure.

As illustrated in the method 400 of FIG. 4, the global I/O device driver may be called if the access right associated with the I/O device is emulate. FIG. 5 is a flowchart of a method 500 for utilizing a global I/O device driver to manage I/O access rights in a computing environment 100 in accordance with one aspect. As mentioned above, the global I/O device driver may be stored in a secure manner in memory such that access to the global I/O device driver is limited or otherwise managed.

At operation 502, the microprocessor may enter a secure operating mode so that the global I/O device driver may be executed in the secure operating mode. In general, microprocessors may operate in one of several modes configured for a particular purpose. Through the secure operating mode of the microprocessor, the global I/O device driver may handle legacy I/O port and MMIO register emulation in a manner completely isolated from all the other software running on the microprocessor and computing environment 100. In one illustrative example, the new microprocessor secure mode may be a flat mode with paging and virtualization disabled, although other secure features may be implemented or included in the secure operating mode of the microprocessor. As described above, the secure mode may be entered when a load or store data memory access is to be emulated per the secure MMIO or legacy I/O access rights policy.

In operation 504, the microprocessor may store new register values that allow the microprocessor exclusive access to a single microprocessor thread. The original register values may be saved and restored by the microprocessor upon exiting the secure operating mode. In one illustrative example, the secure mode may be a 64-bit instruction mode and the register values may be as follows:

RAX [63]: 0=MMIO access, 1=legacy I/O access.
RAX [62]: 0=load port, 1=store port (MMIO); 0=legacy I/O, 1=address CFCh-CFFh (legacy I/O).
RAX [61]: 0=no store intent, 1=store intent (MMIO); 0=IN, 1=OUT (legacy I/O).
RAX [59:58]: Access size (0=1 byte, 1=2 bytes, 2=4 bytes, 3=8 bytes).
RAX [57]: 0=Operating System (OS)/Virtual Machine (VM) access, 1=System Management Mode (SMM) access.
RAX [56:39]: Reserved.
RAX [38:0]: Physical address of MMIO access, legacy I/O port address or PCIe configuration cycle depending on the type of access.
RBX [63:0]: Microprocessor thread ID (0-15).
RDX [31:0]=Legacy I/O port data attempted to be written by software to the corresponding legacy I/O port.
RIP=address 62000000h.
IDT limit=0.
RSP=address 62000000h.

However, it should be appreciated that the register values discussed above are but examples of register values for use in safe mode and any other values may be utilized to operate the microprocessor in safe mode.

As discussed above, the global I/O device driver may perform the emulation of the I/O device accesses for the computing environment 100 in operation 506. After emulation, the global I/O device driver may exit by executing an instruction that causes the microprocessor to return to the legacy IN-type instruction if emulating such a legacy I/O port access.

The securely managed access rights may also be used to store PCIe configuration access rights. The PCIe configuration space may be accessed either through the MMIO space or via legacy I/O ports. The microprocessor determines the access rights of a PCIe configuration space register using the same steps as for the regular MMIO register described above, irrespective of the access method (MMIO or legacy I/O ports). The microprocessor handles the legacy I/O ports accesses like any legacy I/O ports access with the exception of determining the access rights (the microprocessor uses the MMIO access rights for legacy I/O ports and legacy I/O port access rights for all the other legacy I/O ports).

As also described above, the legacy I/O access rights may reside in the protected MEE region of the memory. In one example, the legacy I/O access rights may reside at address 61000000h in the MEE region, although such access rights may reside at any address in the memory of the computing environment 100. In one illustrative example, the access rights for each legacy I/O port may be defined via a 16-bit field with the following definition:

bits [15:4]=I/O device ID (0-4095).
bits [3:2]=reserved.
bits [1:0]=access rights (0/1=emulate, 2=allow access, 3=block access).

As above, however, any bit field may be utilized to store and identify the access rights of each legacy I/O port of the computing environment 100. In some instances, legacy I/O ports can be accessed via IN-type assembly instructions (used to input a string of bits to a memory location) and OUT-type assembly instructions (used to output a string of bits from a memory location). Further, multiple legacy I/O ports may be accessed simultaneously by a single instruction and the microprocessor may enforce the block access rights if all the legacy I/O ports accessed by the same instruction do not have the same access rights and I/O device ID.

Figure 6:
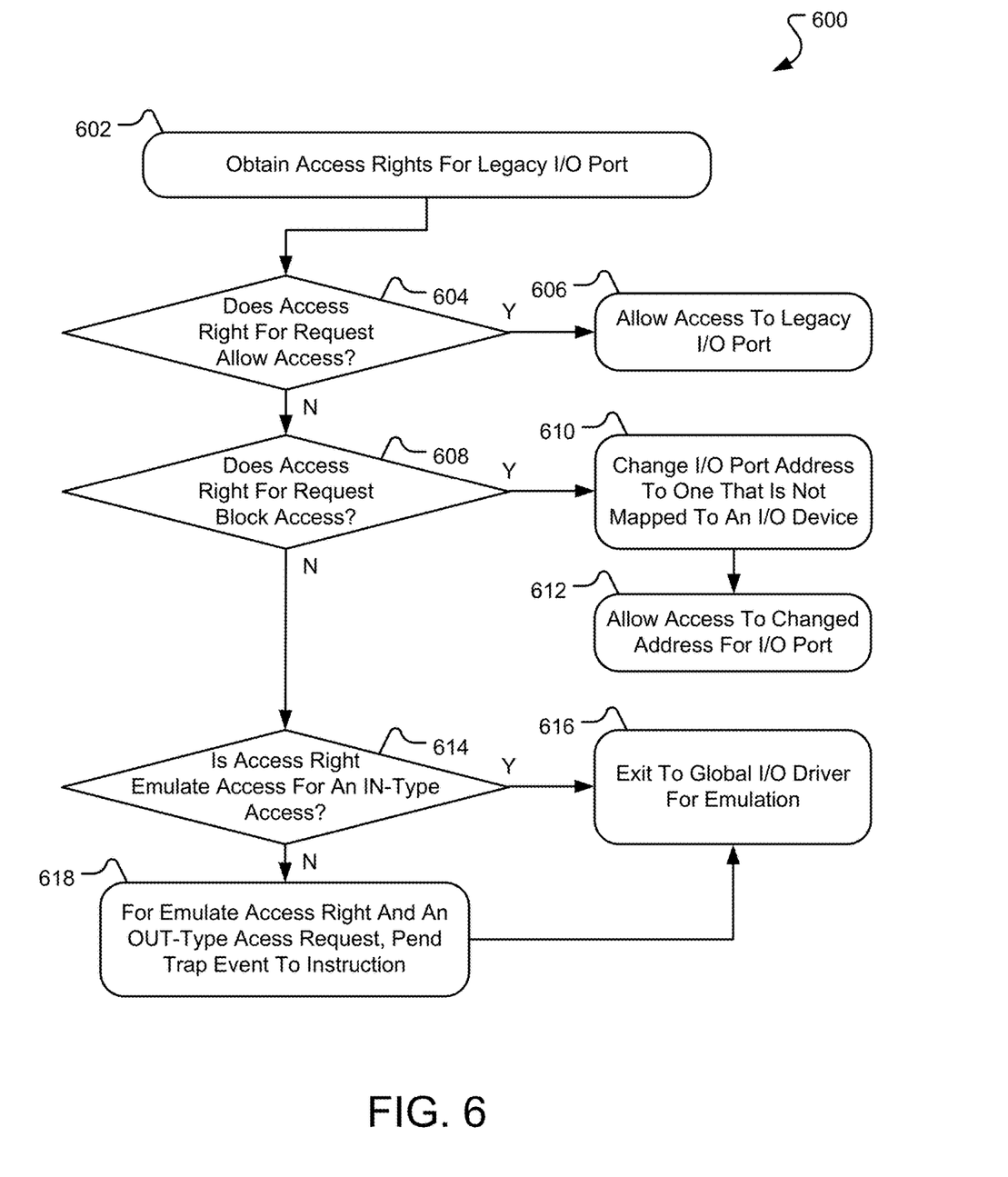
FIG. 6 is a flowchart illustrating an example of a method for managing legacy I/O port access rights in a computing environment in accordance with aspects of the disclosure.

The microprocessor may utilize the legacy I/O access rights stored in the protected MEE region to enforce an access policy for software access of the legacy I/O ports. In particular, FIG. 6 is a flowchart of a method 600 for managing legacy I/O port access rights in a computing environment 100 in accordance with one aspect. The operations of the method 600 may be executed or performed by the microprocessor of a computing environment (such as the CPU 101 of the computing environment 100 of FIG. 1) or any other computing device. The method 600 may be executed in response to receive a request to access one or more legacy I/O ports of the computing environment 100 or microprocessor.

Beginning in operation 602, the microprocessor may obtain one or more access rights for a legacy I/O port associated with a request from a software program. The legacy I/O access rights may be obtained from the protected MEE memory space discussed above. In operation 604, the microprocessor may determine if the obtained access right associated with the request is an "allow" access right. If yes, the microprocessor may allow access to the I/O legacy port in operation 606. If the microprocessor determines that the access right is not an allow right, the microprocessor may determine, in operation 608, if the legacy I/O access right associated with the request is a "block" access right. If yes, the microprocessor may change the legacy I/O port address to an address that is not mapped to any I/O devices in operation 610. Further, the changed I/O port address may cause a controller program of the computing environment 100 to abort the operation. Following the address change, the microprocessor may allow the legacy I/O port access to the changed address for the I/O port.

If the obtained access rights for the memory request is not an allow or block right, the microprocessor may determine that the access right is an emulate access right in operation 614. In addition, the microprocessor may determine if the legacy I/O port request is an IN-type access. Emulate access rights for an IN-type access request may cause the microprocessor to activate the global I/O device driver in operation 616. The global I/O driver performs the emulation of the IN-type access for the identified legacy I/O port access. The global I/O driver will perform the emulation of the IN-type legacy I/O port access using the information provided by the microprocessor (legacy I/O port address, access type, access size, microprocessor thread identifier). The global I/O driver will then exit, and the microprocessor will restart the original instruction. If the legacy I/O port access is of the IN-type and the access right is emulate access and this is an emulated access by the global I/O driver, the microprocessor may skip the legacy I/O port input and will return the data emulated by the global I/O driver.

If the access right is emulate and the request is an OUT-Type access request, the microprocessor may pend a high-priority trap event that will be taken by the microprocessor at the very end of the instruction in operation 618. The microprocessor may also exit to the global I/O device driver in operation 616. The global I/O driver will perform the emulation of the OUT-type legacy I/O port access using the information provided by the microprocessor (physical address, access type, access size, microprocessor thread identifier and data that the software attempted to output to the corresponding legacy I/O port). The global I/O driver will then exit, and the microprocessor will restart the next instruction in the instruction stream.

Figure 7:
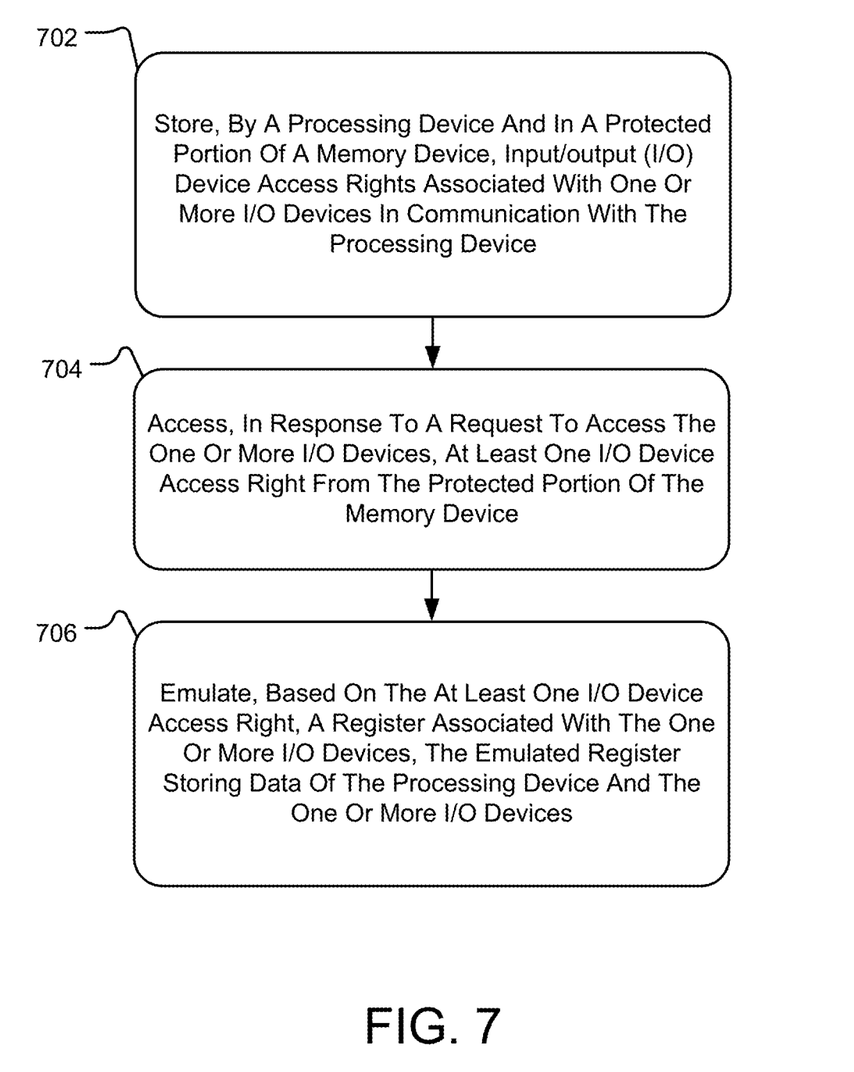
FIG. 7 is a flowchart illustrating an example of a method for secure computing management, in accordance with aspects of the disclosure.

FIG. 7 is a flowchart illustrating an example of a method for secure computing management, in accordance with aspects of the disclosure. The method may include, at operation 702, storing, by a processing device (such as CPU die 104) and in a protected portion of a memory device (such as memory devices 105), input/output (I/O) device access rights associated with one or more I/O devices in communication with the processing device. In one illustrative example, the one or more I/O devices may be I/O devices 106 of FIG. 1. The method may also include, at operation 704, accessing, in response to a request to access the one or more I/O devices 106, at least one I/O device access right from the protected portion of the memory device 105. The method may further include, at operation 706, emulating, based on the at least one I/O device access right, a register associated with the one or more I/O devices 106. The emulated register stores data of the processing device and the one or more I/O devices.

In some cases, the at least one I/O device access right may include a plurality of Memory Mapped I/O (MMIO) access rights. In such cases, the method may include storing the plurality of MMIO access rights in a plurality of memory pages, with each of the plurality of memory pages including a plurality of entries. Each of the plurality of entries may include an indicator to access a different memory page of the plurality of memory pages or an indicator of an access right for the one or more I/O devices. In some cases, the indicator of the access right may include an indicator of an allow access right, an indicator of a block access right, or an indicator of an emulate access right, as described herein. In some aspects, the indicator of the access right for the one or more I/O devices may include an identifier of the one or more I/O devices.

The method may also or alternatively include the operation of accessing, from the protected portion of the memory device, a global I/O device driver configured to emulate the register associated with the one or more I/O devices. In some cases, the at least one I/O device access right may include a legacy I/O port access right including a block access right such that the method may include changing an I/O port address associated with a legacy I/O port. In some instances, the method may further include operating the processing device in a secure mode (as described previously) and storing data associated one or more I/O devices in the emulated register.

Through the methods and systems described herein, secure access to I/O devices of a computing environment may be managed to prevent hijacking or malicious access to the I/O devices by software executed by a microprocessor. For example, debug at scale may use a management controller (e.g., a Baseboard Management Controller (BMC)) in a server platform as the controller of a particular interface (e.g., a Joint Test Action Group (JTAG) interface) connected to the processing device. If the management controller (e.g., the BMC) is hijacked or otherwise misappropriated over its manageability network, malicious software can fully control the microprocessor and potentially cause permanent denial of service (PDOS). The I/O Device Emulation techniques discussed herein may be used to prevent potential permanent denial of service (PDOS) attacks by enabling a probe operating mode only after the BIOS configures the I/O device emulation resources (e.g., the MEE, the MMIO access rights, the legacy I/O port access rights, and/or the global I/O device driver) described herein. By emulating access to the I/O devices, the techniques may prevent hijacking of a management controller executed in the server platform.

In some examples, the methods or processes described herein (e.g., the method 300 or other methods or processes described herein) may be performed by a computing device or apparatus or a component of a computing device or apparatus. In one example, the processes can be performed by a processor or CPU (e.g., the CPU die 104 in FIG. 1). The computing device can include any suitable device, such as a mobile device (e.g., a mobile phone), a desktop computing device, a tablet computing device, a wearable device (e.g., a virtual reality or augmented reality headset, a network-connected watch or smartwatch, or other wearable device), a server computer, an autonomous vehicle or computing device of an autonomous vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s).

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Aspects of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various aspects of the disclosure or described with different terminology. These and other variations, modifications, additions, and improvements may fall within the scope of the disclosure as defined in the claims that follow.

Various aspects of the disclosure are discussed in detail above. While specific implementations are discussed, it should be understood that this is done for illustration purposes only. A person skilled in the relevant art will recognize that other components and configurations may be used without parting from the spirit and scope of the disclosure. Thus, the preceding description and drawings are illustrative and are not to be construed as limiting. Numerous specific details are described to provide a thorough understanding of the disclosure. However, in certain instances, well-known or conventional details are not described in order to avoid obscuring the description.

References to one or an aspect in the present disclosure can be references to the same aspect or any aspect; and, such references mean at least one of the aspects. Reference to "one aspect" or "an aspect" means that a particular feature, structure, or characteristic described in connection with the aspect is included in at least one aspect of the disclosure. The appearances of the phrase "in one aspect" in various places in the specification are not necessarily all referring to the same aspect, nor are separate or alternative aspects mutually exclusive of other aspects. Moreover, various features are described which may be exhibited by some aspects and not by others.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Various modifications and additions can be made to the example aspects discussed without departing from the scope of the description. For example, while the aspects described above refer to particular features, the scope of the application can also include aspects having different combinations of features and aspects that do not include all of the described features. Accordingly, the scope of the present description is intended to embrace all such alternatives, modifications, and variations together with all equivalents thereof.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various aspects given in this specification.

Illustrative aspects of the disclosure include;

Aspect 1. A secure computing management method. The method may include the operations of storing, by a processing device and in a protected portion of a memory device, input/output (I/O) device access rights associated with one or more I/O devices in communication with the processing device, accessing, in response to a request to access the one or more I/O devices, at least one I/O device access right from the protected portion of the memory device, and emulating, based on the at least one I/O device access right, a register associated with the one or more I/O devices, the emulated register storing data of the processing device and the one or more I/O devices.

Aspect 2. The secure computing management method of Aspect 1, wherein the I/O device access rights comprise a plurality of Memory Mapped I/O (MMIO) access rights.

Aspect 3. The secure computing management method of Aspect 2, further comprising storing the plurality of MMIO access rights in a plurality of memory pages, each of the plurality of memory pages comprising a plurality of entries.

Aspect 4. The secure computing management method of Aspect 3, wherein each of the plurality of entries comprises one of an indicator to access a different memory page of the plurality of memory pages or an indicator of an access right for the one or more I/O devices.

Aspect 5. The secure computing management method of Aspect 4, wherein the indicator of the access right comprises an indicator of an allow access right, an indicator of a block access right, or an indicator of an emulate access right.

Aspect 6. The secure computing management method of Aspect 4 or 5, wherein the indicator of the access right for the one or more I/O devices further comprises an identifier of the one or more I/O devices.

Aspect 7. The secure computing management method of any of Aspects 1 to 6, further comprising accessing, from the protected portion of the memory device, a global I/O device driver configured to emulate the register associated with the one or more I/O devices.

Aspect 8. The secure computing management method of any of Aspects 1 to 7, wherein the I/O device access rights comprise a legacy I/O port access right.

Aspect 9. The secure computing management method of Aspect 8, wherein the legacy I/O port access right comprises a block access right, the method further comprising changing an I/O port address associated with a legacy I/O port.

Aspect 10. The secure computing management method of any of Aspects 1 to 9, further comprising operating the processing device in a secure mode and storing data associated one or more I/O devices in the emulated register.

Aspect 11. A processing device comprising a non-transitory computer-readable medium encoded with instructions. When the instructions are executed by the processing device, the processing device may store, in a protected portion of the computer-readable medium, input/output (I/O) device access rights associated with one or more I/O devices in communication with the processing device. The central processing unit may also access, in response to a request to access the one or more I/O devices, at least one I/O device access right from the protected portion of the computer-readable medium and emulate, based on the at least one I/O device access right, a register associated with the one or more I/O devices, the register storing data transmitted from the processing device and the one or more I/O devices.

Aspect 12. The processing device of Aspect 11, wherein the at least one I/O device access right comprises a plurality of Memory Mapped I/O (MMIO) access rights.

Aspect 13. The processing device of Aspect 12, wherein the instructions further cause the processing device to store the plurality of MMIO access rights in a plurality of memory pages, each of the plurality of memory pages comprising a plurality of entries.

Aspect 14. The processing device of Aspect 13, wherein each of the plurality of entries comprises one of an indicator to access a different memory page of the plurality of memory pages or an indicator of an access right for the one or more I/O devices.

Aspect 15. The processing device of Aspect 14, wherein the indicator of the access right comprises an indicator of an allow access right, an indicator of a block access right, or an indicator of an emulate access right.

Aspect 16. The processing device of Aspect 11, wherein the processing device is a central processing unit.

Aspect 17. A computer-readable medium storing instructions that, when executed by a processing device, cause the processing device to perform operations according to any of Aspects 1 to 16.

I claim:

1. A secure computing management method comprising:
    storing, by a processing device and in a protected portion of a memory device, input/output (I/O) device access rights associated with one or more I/O devices in communication with the processing device;
    accessing, in response to a request to access the one or more I/O devices, at least one I/O device access right from the protected portion of the memory device; and
    emulating, based on the at least one I/O device access right, a register associated with the one or more I/O devices, the emulated register storing data of the processing device and the one or more I/O devices.

2. The secure computing management method of claim 1, wherein the at least one I/O device access right comprises a plurality of Memory Mapped I/O (MMIO) access rights.

3. The secure computing management method of claim 2, further comprising:
    storing the plurality of MMIO access rights in a plurality of memory pages, each of the plurality of memory pages comprising a plurality of entries.

4. The secure computing management method of claim 3, wherein each of the plurality of entries comprises one of an indicator to access a different memory page of the plurality of memory pages or an indicator of an access right for the one or more I/O devices.

5. The secure computing management method of claim 4, wherein the indicator of the access right comprises an indicator of an allow access right, an indicator of a block access right, or an indicator of an emulate access right.

6. The secure computing management method of claim 4, wherein the indicator of the access right for the one or more I/O devices further comprises an identifier of the one or more I/O devices.

7. The secure computing management method of claim 1, further comprising:
   accessing, from the protected portion of the memory device, a global I/O device driver configured to emulate the register associated with the one or more I/O devices.

8. The secure computing management method of claim 1, wherein the at least one I/O device access right comprises a legacy I/O port access right.

9. The secure computing management method of claim 8, wherein the legacy I/O port access right comprises a block access right, the method further comprising:
   changing an I/O port address associated with a legacy I/O port.

10. The secure computing management method of claim 1, further comprising:
    operating the processing device in a secure mode; and
    storing data associated one or more I/O devices in the emulated register.

11. A processing device, comprising:
    a non-transitory computer-readable medium encoded with instructions, which when executed by the processing device, causes the processing device to:
       store, in a protected portion of the computer-readable medium, input/output (I/O) device access rights associated with one or more I/O devices in communication with the processing device;
       access, in response to a request to access the one or more I/O devices, at least one I/O device access right from the protected portion of the computer-readable medium; and
       emulate, based on the at least one I/O device access right, a register associated with the one or more I/O devices, the register storing data transmitted from the processing device and the one or more I/O devices.

12. The processing device of claim 11, wherein the at least one I/O device access right comprises a plurality of Memory Mapped I/O (MMIO) access rights.

13. The processing device of claim 12, wherein the instructions further cause the processing device to:
    store the plurality of MMIO access rights in a plurality of memory pages, each of the plurality of memory pages comprising a plurality of entries.

14. The processing device of claim 13, wherein each of the plurality of entries comprises one of an indicator to access a different memory page of the plurality of memory pages or an indicator of an access right for the one or more I/O devices.

15. The processing device of claim 14, wherein the indicator of the access right comprises an indicator of an allow access right, an indicator of a block access right, or an indicator of an emulate access right.

16. The processing device of claim 11, wherein the processing device is a central processing unit.

17. A computer-readable medium storing instructions that, when executed by a processing device, cause the processing device to:
    store, in a protected portion of the computer-readable medium, input/output (I/O) device access rights associated with one or more I/O devices in communication with the processing device;
    access, in response to a request to access the one or more I/O devices, at least one I/O device access right from the protected portion of the computer-readable medium; and
    emulate, based on the at least one I/O device access right, a register associated with the one or more I/O devices, the register storing data transmitted from the processing device and the one or more I/O devices.

18. The computer-readable medium of claim 17, wherein the instructions, when executed by the processing device, cause the processing device to:
    access, from the protected portion of the computer-readable medium, a global I/O device driver configured to emulate the register associated with the one or more I/O devices.

19. The computer-readable medium of claim 17, wherein the at least one I/O device access right comprises a legacy I/O port access right, and wherein the legacy I/O port access right comprises a block access right, the instructions, when executed by the processing device, causing the processing device to:
    change an I/O port address associated with a legacy I/O port.

20. The computer-readable medium of claim 17, wherein the instructions, when executed by the processing device, cause the processing device to:
    operate the processing device in a secure mode; and
    store data associated one or more I/O devices in the emulated register.

* * * * *